SIGNAL FOLLOWING CIRCUIT
Filed June 22, 1967

INVENTORS
MAURICE R. BARTZ
DUANE W. BAXTER
GERALD A. GARRY

BY Homer L. Knearl
AGENT 3,492,498

SIGNAL FOLLOWING CIRCUIT

Maurice R. Bartz, Duane W. Baxter, and Gerald A. Garry, Rochester, Minn., assignors to International Business Machines Corporation, Armonk, N.Y., a corporation of New York Filed June 22, 1967, Ser. No. 648,132
Int. Cl. G11c *27/00*
U.S. Cl. 307—235 8 Claims

ABSTRACT OF THE DISCLOSURE

The signal following circuit is selectively operable to follow a first input signal or the combination of a first input signal and a second input signal. The storage element in the circuit is a capacitor. The first input signal is applied to the capacitor across the emitter junction of a transistor. A control transistor selects the mode of operation depending upon whether the control transistor is on or off. When the control transistor is on, the voltage lever stored on the capacitor follows the first input signal. When the control transistor is off, the voltage level on the capacitor is dependent upon both the first input signal and the second input signal. The second input signal is applied to the capacitor across the base to emitter junction of a third transistor. In the second mode of operation depending upon whether the control transistor is input signal when the signal goes below the voltage level stored on the capacitor. The voltage on the capacitor follows the first or second input signal positive when both signals go above the voltage level stored upon the capacitor.

BACKGROUND OF THE INVENTION

This invention relates to a signal following circuit. More particularly, the invention relates to a signal following circuit which is selectively operable to respond to more than one signal.

In the past storage circuits have been designed to store a level from a single input signal. Generally, the capacitive storage element in the circuit is connected to the cathode or emitter of a first active element whose base or grid receives the input signal. This configuration is used to charge the capacitive element in one direction. To charge the capacitive element in the other direction a second active element is connected across the capacitor with the plate or collector connected to the same junction of the capacitive element as the emitter or cathode of the first active element. In this way the second active element acts to charge the capacitor in the opposite direction to the first active element. In operation, the first active element samples the input signal and a resulting charge is stored on the capacitive storage element. The second active element when energized acts to discharge the capacitive storage element.

The prior art circuit is quite successful so long as one only wishes to store the level of a single input signal. However, in some applications, as for example character recognition thresholding, it may be desirable to follow and store portions of a plurality of input signals under different conditions.

PRINCIPLE OF THE INVENTION

It is an object of this invention to control a signal following circuit so that the circuit selectively follows the signal level from one signal or more than one signal.

The above object is accomplished by applying to a signal level storage element a first input signal in one mode and one or more input signals in a second mode. The input signals are applied via emitter junctions of active elements. An additional active element controls the mode of operation of the circuit.

The great advantage of the invention is that by having the ability to follow more than one input signal in a second mode, the utility of the storage circuit is increased in a threshold system. In addition, the circuit contains only a few elements and therefore will be economical to manufacture.

The foregoing and other objects, features and advantages of the invention will be apparent from the following more particular description of a preferred embodiment of the invention, as illustrated in the accompanying drawings.

DESCRIPTION

Figure 1:
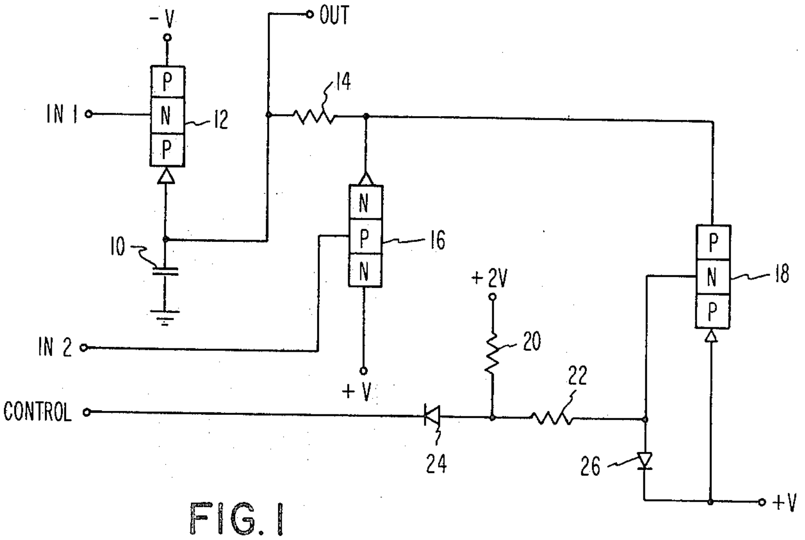
FIG. 1 shows a circuit schematic for the preferred embodiment of the invention.

Referring now to FIG. 1, the capacitive storage element 10 is connected to the first input signal (IN1) across the base-emitter junction of PNP transistor 12. The same terminal of the capacitor 10 is also connected to the second input signal (IN2) via resistor 14 and the base-emitter junction of NPN transistor 16. The same terminal of capacitor 10 is also connected selectively to the +V voltage source through resistor 14 and transistor 18.

Transistor 18 functions as a switch. When the transistor is saturated, +V appears at the collector terminal of the transistor. When the transistor is non-conducting, the collector terminal is not connected to the +V voltage source.The purpose of the resistor 14 is to load the collector of transistor 18 when the transistor is conducting. This permits the voltage on capacitor 10 to follow the first input signal across the base-emitter junction of transistor 12. If resistor 14 were not present, the voltage on capacitor 10 would be held at +V when transistor 18 saturated.

To bias the transistor 18 so as to turn it on and off, resistors 20 and 22 and diodes 24 and 26 are provided. If the control voltage applied to the cathode of diode 24 is 0 volts, diode 24 is conducting and clamps the voltage at the junction of resistor 20 and 22 to 0 volts. Current then flows from the +V source through the base-emitter junction of the transistor 18 through resistor 22 to the anode of diode 24. The transistor 18 is saturated and the +V voltage appears at the collector of transistor 18. The purpose of resistor 22 is to load the base of transistor 18 so as to limit the current flow during the "on" condition or saturated condition of the transistor 18.

To turn transistor 18 off, the control voltage rises to +2V. Diode 24 is then biased off by the voltage dividing action of resistors 20, 22 and diode 26 between the +2V voltage source and the +V voltage source. The purpose of diode 26 is to limit the reverse base-emitter voltage when the transistor 18 is cut off. By limiting this voltage to the voltage drop across diode 26, the transistor 18 may be more easily and more rapidly driven into saturation when turned on.

OPERATION

Now referring to FIGS. 1 and 2, the operation of the preferred embodiment of the invention in FIG. 1 will be described with reference to the waveforms shown in FIG. 2. It will be appreciated by one skilled in the art that the polarity of the waveforms in FIG. 2 could be inverted and the circuit of FIG. 1 adapted to operate on the inverted waveforms by changing the PNP transistors to NPN transistors and vice versa and by changing the polarity of the biasing networks.

Figure 2:
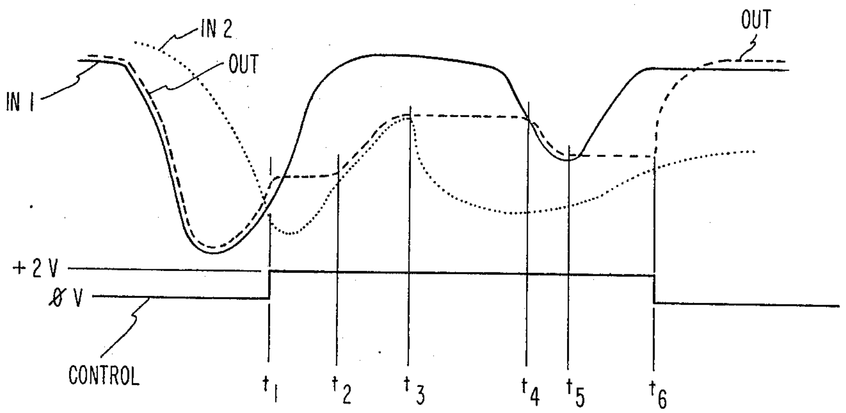
FIG. 2 shows input and output waveforms for the circuit in FIG. 1.

As shown in FIG. 2, the control signal is initially at 0 volts, and therefore transistor 18 is saturated. The +V voltage is applied to the resistor 14. In this first mode the voltage level on capacitor 10 will follow the first input signal (IN1). In other words, as the first input signal goes more negative than the voltage stored on capacitor 10, the capacitor 10 is discharged across the base-emitter junction of transistor 12. On the other hand, as the first input signal goes more positive than the voltage on capacitor 10, the capacitor 10 is charged by current through resistor 14 from the +V voltage source so that as the first input signal goes more positive the voltage level on capacitor 10 follows.

At time $t_1$ the control signal rises to +2V and turns off or cuts off transistor 18. In this second mode the voltage on capacitor 10 will still follow the first input signal if the input signal goes below or more negative than the voltage stored on the capacitor. Thus, the voltage level on capacitor 10 will follow the first input signal down and will stay at the most negative level of the first input signal.

If the second input signal is present during the second mode and is applied to the base terminal of transistor 16, the voltage level on capacitor 10 may be able to follow positive swings in the second input signal (IN2). Two conditions must be met for the voltage on capacitor 10 to follow the positive swing in the second input signal. First, the second input signal must be more positive than the voltage level stored on capacitor 10. Second, the voltage level of the first input signal must also be more positive than the voltage stored on capacitor 10; otherwise, the base-emitter junction of transistor 12 holds the voltage level of capacitor 10 to the first input signal voltage level.

Again referring to the waveforms in FIG. 2, initially the output signal from capacitor 10 follows the IN1 signal as the control signal has turned transistor 18 on. When at time $t_1$ transistor 18 is turned off by the control signal, the output voltage holds the value of the IN1 signal at time $t_1$. The IN1 signal continues to go more positive and thus back biases the base-emitter junction of transistor 12. Meanwhile the IN2 signal is going negative; it does not come back up to a voltage more positive than the voltage on capacitor 10 until time $t_2$. As the IN2 signal goes more positive than the voltage on capacitor 10, the voltage on capacitor 10 follows the IN2 signal. During this interval the base-emitter junction of transistor 12 remains back biased as the IN1 signal is more positive than the IN2 signal.

At time $t_3$ the IN2 signal again goes down. The base-emitter junction of transistor 16 is then back biased, and capacitor 10 holds the most recent maximum positive voltage of the second input signal until time $t_4$. At time $t_4$ the IN1 signal goes below the voltage level stored on capacitor 10 and forward biases the base-emitter junction of transistor 12. Accordingly, capacitor 10 is discharged and follows the first input signal more negative until the first input signal again swings more positive at time $t_5$. At time $t_5$ the base-emitter junction of transistor 12 is back biased, and the voltage level on capacitor 10 holds the most recent negative point in the first input signal.

Finally, at time $t_6$ the control signal again turns on transistor 18. The circuit then goes back to the first mode with the voltage level on capacitor 10 following the first input signal. There is a small delay before the voltage on capacitor 10 reaches the voltage level of the first input signal as the capacitor 10 must be charged up through the resistor 14.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Signal level storage apparatus for storing the level of either a first or second input signal comprising:
- storage means for storing the most recent signal level applied to said storage means;
- first means for applying to said storage means the level of the first input signal as the level varies in either direction;
- second means for applying to said storage means the level of the first input signal as the level varies in one direction from the level stored in said storage means and for applying also the level of the second input signal as both the first and second input signal level vary in the other direction from the level stored in said storage means;
- control means for activating only said first applying means in a first mode and for activating only said second applying means in a second mode so that during the first mode the level stored in said storage means follows the level of the first input signal and during the second mode the level stored in said storage means follows the level of the first input signal if it varies in one direction away from the level stored in said storage means or follows the level from either the first or second input signals, whichever is closer to the level stored in said storage means, as both signal levels vary in the other direction relative to the level stored in said storage means.

2. The apparatus of claim 1 wherein said storage means comprises:
- a capacitive storage element for storing a voltage level.

3. The apparatus of claim 2 wherein said first applying means comprises:
- a first current source which applies current to said capacitive storage element in one direction until the voltage level across said storage element is the level of the first input signal;
- a second current source for applying current to said capacitive storage element in the other direction until the voltage level on said storage element equals the level of the first input signal.

4. The apparatus of claim 2 wherein said second applying means comprises:
- a first current source for applying current to said capacitive storage element in one direction until the voltage level across said storage element follows the level of the first input signal as the first input signal level moves in the one direction relative to the stored level;
- a second current source for applying current to said capacitive storage element in the other direction so that the voltage level stored on said storage element follows the level of either the first input signal or the second input signal, whichever is closer to the stored level on said storage element, when the levels of said first input signal and said second input signal vary in the other direction relative to the stored level on said storage element.

5. A selective signal following circuit for following one of a plurality of input signals comprising:
- a capacitive storage means for storing a voltage level;
- a first current source responsive to a first input signal for charging said capacitive storage means in a first direction when the level of the first input signal varies in the first direction relative to the stored level on said capacitive storage means;
- a second current source conditioned on or off by a control signal for charging said capacitive storage means in a second direction opposite to the first direction supplied by said first current source so that, when said second current source is "on," the stored level on said capacitive storage means follows the first input signal in either direction and when said second current source is off the stored level follows the first input signal in only the first direction;

a third current source responsive to a second input signal, when said second current source is off, for charging said capacitive storage means in the second direction when the second input signal applied to said third current source is in the second direction relative to the stored level on said capacitive storage means and when the level of the first input signal is also in the second direction relative to the stored level on said capacitive storage means so that, when the second current source is off, the stored level follows either the first or the second input signal whichever is closer to the stored level when both are varying in the second direction relative to the stored level.

6. The apparatus of claim 5 wherein said first current source comprises:

a PNP transistor having its emitter junction connected to said capacitive storage means, its collector junction connected to a voltage source and its base terminal connected to the first input signal.

7. The apparatus of claim 5 wherein said second current source comprises:

a PNP transistor having its emitter junction connected to a voltage source, its collector junction connected to said storage means and its base terminal connected to a control signal for turning said transistor on and off.

8. The apparatus of claim 5 wherein said third current source comprises:

an NPN transistor having its emitter terminal connected to said capacitive storage means, its collector terminal connected to a voltage source and its base terminal connected to the second input signal.

References Cited

UNITED STATES PATENTS

| | | | |
|---|---|---|---|
| 3,140,406 | 7/1964 | Thompson | 328—127 X |
| 3,267,293 | 8/1966 | Hinds | 307—236 |

OTHER REFERENCES

IBM Technical Disclosure Bulletin, "Instantaneous Analog Storage Circuit," by Bartz et al., vol. 7, No. 2, July 1964, pp. 124–125.

IBM Technical Disclosure Bulletin, "Base Line Follower," by M. Bartz, vol. 8, No. 6, November 1965, pp. 914–916.

DONALD D. FORRER, Primary Examiner

STANLEY D. MILLER, Assistant Examiner

U.S. Cl. X.R.

307—238, 246; 328—151